US010948723B1

(12) United States Patent
Chi et al.

(10) Patent No.: US 10,948,723 B1
(45) Date of Patent: Mar. 16, 2021

(54) MULTI-LINE SCANNING DISPLAY FOR NEAR-EYE DISPLAYS

(71) Applicant: Facebook Technologies, LLC, Menlo Park, CA (US)

(72) Inventors: Wanli Chi, Sammamish, WA (US); Yijing Fu, Redmond, WA (US); Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 95 days.

(21) Appl. No.: 15/844,281

(22) Filed: Dec. 15, 2017

(51) Int. Cl.
*G02B 27/01* (2006.01)
*H04N 5/225* (2006.01)
*H04N 5/235* (2006.01)

(52) U.S. Cl.
CPC ..... *G02B 27/0172* (2013.01); *G02B 27/0176* (2013.01); *G02B 27/0179* (2013.01); *H04N 5/2251* (2013.01); *H04N 5/235* (2013.01); *G02B 2027/0174* (2013.01); *G02B 2027/0178* (2013.01)

(58) Field of Classification Search
CPC ............ G02B 27/0172; G02B 27/0179; G02B 27/0176; G02B 2027/0178; G02B 2027/0174; H04N 5/235; H04N 5/2251
See application file for complete search history.

(56) References Cited

U.S. PATENT DOCUMENTS

| 6,351,335 | B1* | 2/2002 | Perlin | G02B 13/00 |
| | | | | 345/1.1 |
| 8,233,204 | B1* | 7/2012 | Robbins | G02B 5/1828 |
| | | | | 345/7 |
| 8,705,177 | B1* | 4/2014 | Miao | G02B 27/0172 |
| | | | | 359/630 |
| 2006/0017655 | A1* | 1/2006 | Brown | H04N 9/3129 |
| | | | | 345/7 |
| 2009/0052837 | A1* | 2/2009 | Safrani | G02F 1/31 |
| | | | | 385/16 |
| 2017/0289433 | A1* | 10/2017 | Okada | G03B 17/56 |
| 2018/0314325 | A1* | 11/2018 | Gibson | G06F 3/013 |
| 2019/0086598 | A1* | 3/2019 | Futterer | G02B 6/0031 |
| 2019/0086679 | A1* | 3/2019 | Ratcliff | G02B 27/2214 |
| 2019/0132574 | A1* | 5/2019 | Price | H04N 13/207 |

\* cited by examiner

*Primary Examiner* — Patrick N Edouard
*Assistant Examiner* — Joseph P Fox
(74) *Attorney, Agent, or Firm* — Fenwick & West LLP

(57) ABSTRACT

A scanning display includes a light source and a scanning assembly. The light source is configured to emit source light from a plurality of rows of emitters that are arranged parallel to a first dimension. The scanning assembly includes at least one optical element that conditions the source light. The scanning assembly is configured to scan the conditioned source light along a second dimension that is orthogonal to the first dimension. The scanning assembly configured to output the scanned light over a portion of a target area of an output waveguide. And a brightness of the scanned image light offsets dimming caused by the output waveguide expanding the scanned light in at least one dimension.

20 Claims, 9 Drawing Sheets

Near-Eye Display
100

Display
110

Frame
105

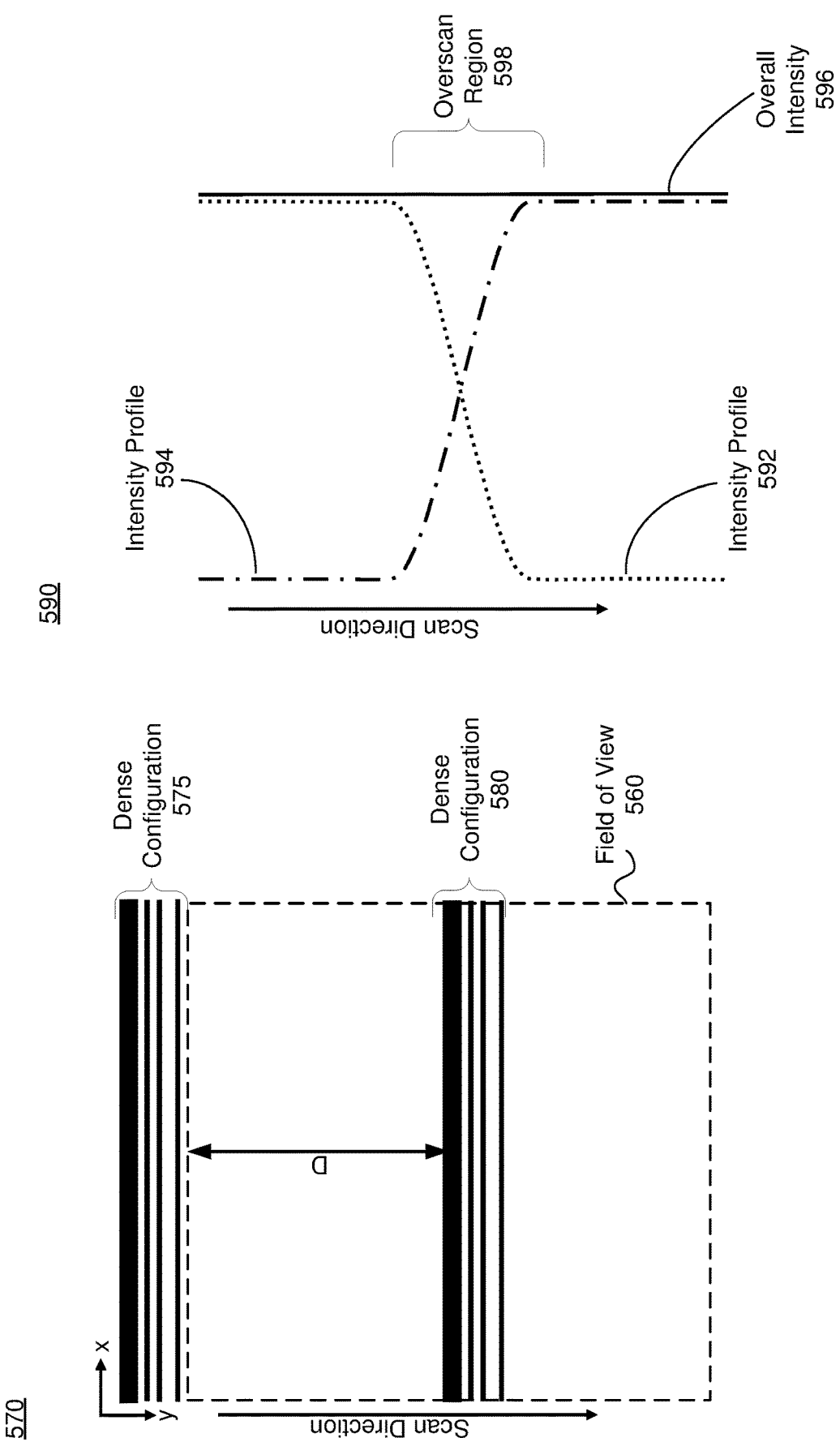

MULTI-LINE SCANNING DISPLAY FOR NEAR-EYE DISPLAYS

BACKGROUND

This disclosure relates generally to a-near eye displays (NEDs), and in particular, to multi-line scanning displays for use in NEDs.

Conventional headsets used for presentation of content are quite bulky. And for artificial reality applications is desirable to have a light headset. The display for conventional headsets often includes one or more relatively large panels that provide image light to the eye using a somewhat bulky optical assembly. Accordingly, in order to provide a better user experience it is desirable to reduce form factor, weight, etc., of conventional displays. Moreover, it is desirable to do so in a manner that does not sacrifice brightness of content presented to the user.

SUMMARY

A multi-line scanning display ("scanning display") for generating content. The scanning display includes a light source and a scanning assembly. The light source is configured to emit source light from a plurality of rows of emitters that are arranged parallel to a first dimension. The rows of emitters may be arranged in one or more dense configurations or a sparse configuration. The scanning assembly includes at least one optical element that conditions the source light. The scanning assembly is configured to scan the conditioned source light along a second dimension that is orthogonal to the first dimension, and output the scanned light to a portion of a target area of an output waveguide. Brightness of the scanned image light offsets dimming caused by the output waveguide expanding the scanned light in at least one dimension.

In some embodiments, a NED includes the scanning display and an output waveguide. In these embodiments, the scanning assembly is configured to output the scanned light over a portion of a target area that is an entrance to the output waveguide. The output waveguide is configured to expand the in-coupled light in at least one dimension to form expanded image light, the output waveguide configured to output the expanded image light to an eyebox of the NED. The NED may operate in an artificial reality environment.

BRIEF DESCRIPTION OF THE DRAWINGS

FIG. 5C illustrates a scan methodology for a light source that includes two dense configurations, in accordance with one or more embodiments.

FIG. 5D illustrates a plot of an intensity transition between two adjacent dense configurations, in accordance with one or more embodiments.

Figure 1:
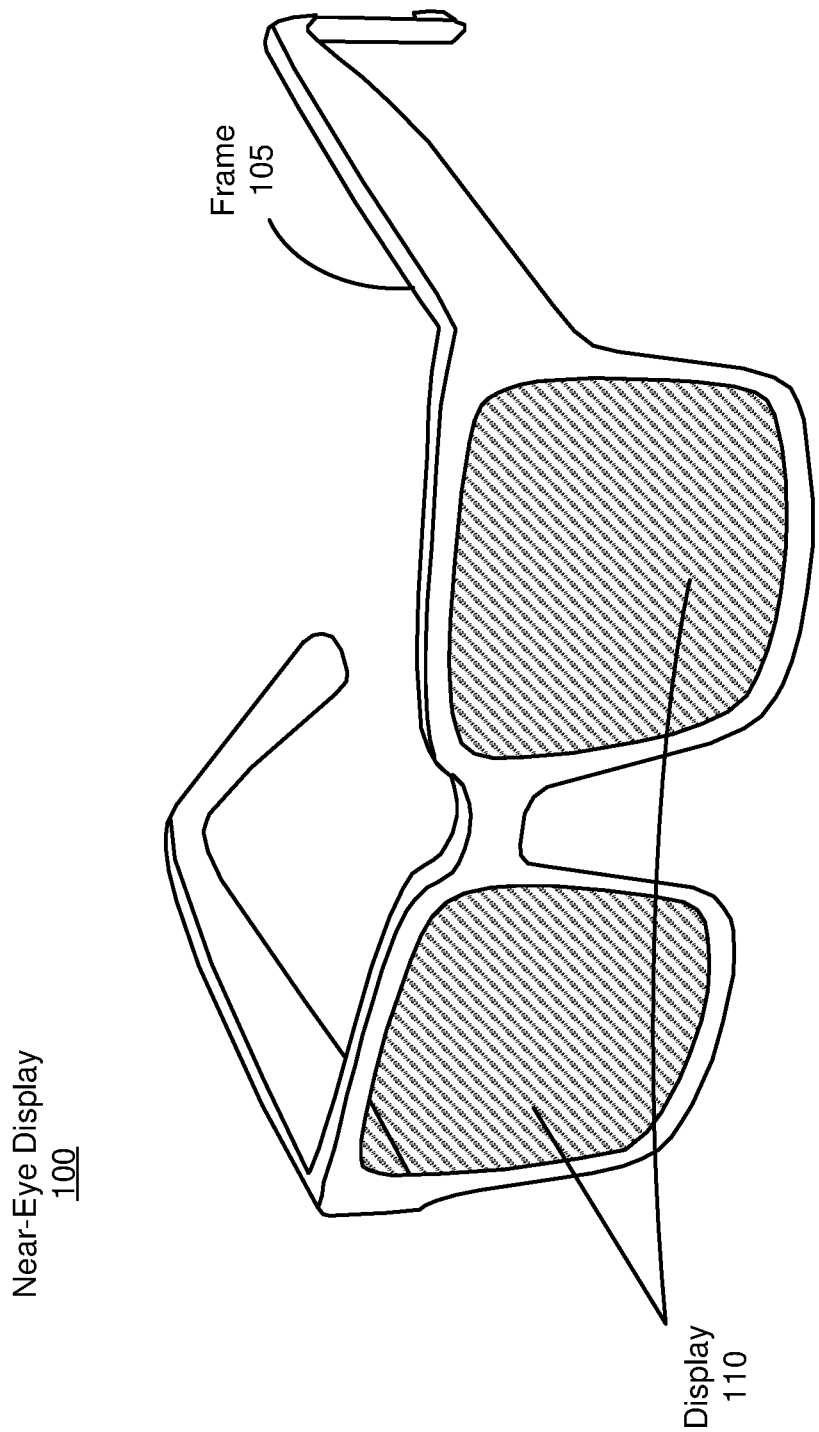
FIG. 1 is a perspective view of a near-eye-display (NED), in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A multi-line scanning display ("scanning display") for generating content. The scanning display includes a light source and a scanning assembly. The light source is configured to emit source light from a plurality of rows of emitters that are arranged parallel to a first dimension. The plurality of rows of emitters include at least a first subset of rows of emitters. In some embodiments, the first subset of rows of emitters is made up of all of the plurality of rows of emitters. The rows of emitters are separated from each other by a threshold distance. In some cases the first subset of rows of emitters has a dense configuration (i.e., the threshold distance is relatively small (e.g., 5-10 microns) and there is a relatively small number of rows (e.g., 30)). In other cases the first subset of rows of emitters is in a sparse configuration and may have a relatively large (e.g., 200 microns) spacing between adjacent rows of emitters. In other embodiments, the plurality of rows of emitters also includes a second subset of rows of emitters. In this case the first and second subsets of rows of emitters each have a dense configuration, but are separated from each other by a distance that is much greater than the threshold distance.

The scanning assembly includes at least one optical element that conditions (e.g., collimates) the source light.

The scanning assembly is configured to scan the conditioned source light along a second dimension (i.e., a scanning direction) that is orthogonal to the first dimension. The scanning assembly may include a scanning mirror to scan the light. In alternate embodiments, the scanning assembly vibrates the optical element (e.g., using voice coil motors) to scan the conditioned source light. Or the scanning assembly may include one or more liquid lenses that dynamically adjust a direction of light output from the optical element to scan the conditioned source light. The scanning assembly is configured to output the scanned light over a portion of a target area (e.g., a coupling element of an output waveguide).

In some embodiments, a NED includes the scanning display and an output waveguide. In these embodiments, the scanning assembly is configured to output the scanned light over a portion of a target area that is an entrance (e.g., a coupling element) to the output waveguide. The output waveguide is configured to expand the in-coupled light in at least one dimension to form expanded image light, the output waveguide configured to output the expanded image light to an eyebox of the NED. In this embodiment, a brightness of the image light in-coupled to the output waveguide is bright enough to mitigate dimming of the image light caused in part due its expansion within the output waveguide. The NED may operate in an artificial reality environment.

System Overview

FIG. 1 is a perspective view of a NED 100 (also referred to as a Head-Mounted Display (HMD)), in accordance with one or more embodiments. The NED 100 presents media to a user. Examples of media presented by the NED 100 include at least one of images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as an artificial reality NED. In some embodiments the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIGS. 2 & 3, the display 110 includes at least a scanning display assembly to generate image light to present media to an eye of the user. The scanning display assembly includes a source assembly and an output waveguide, both of which are described in detail below.

Figure 2:
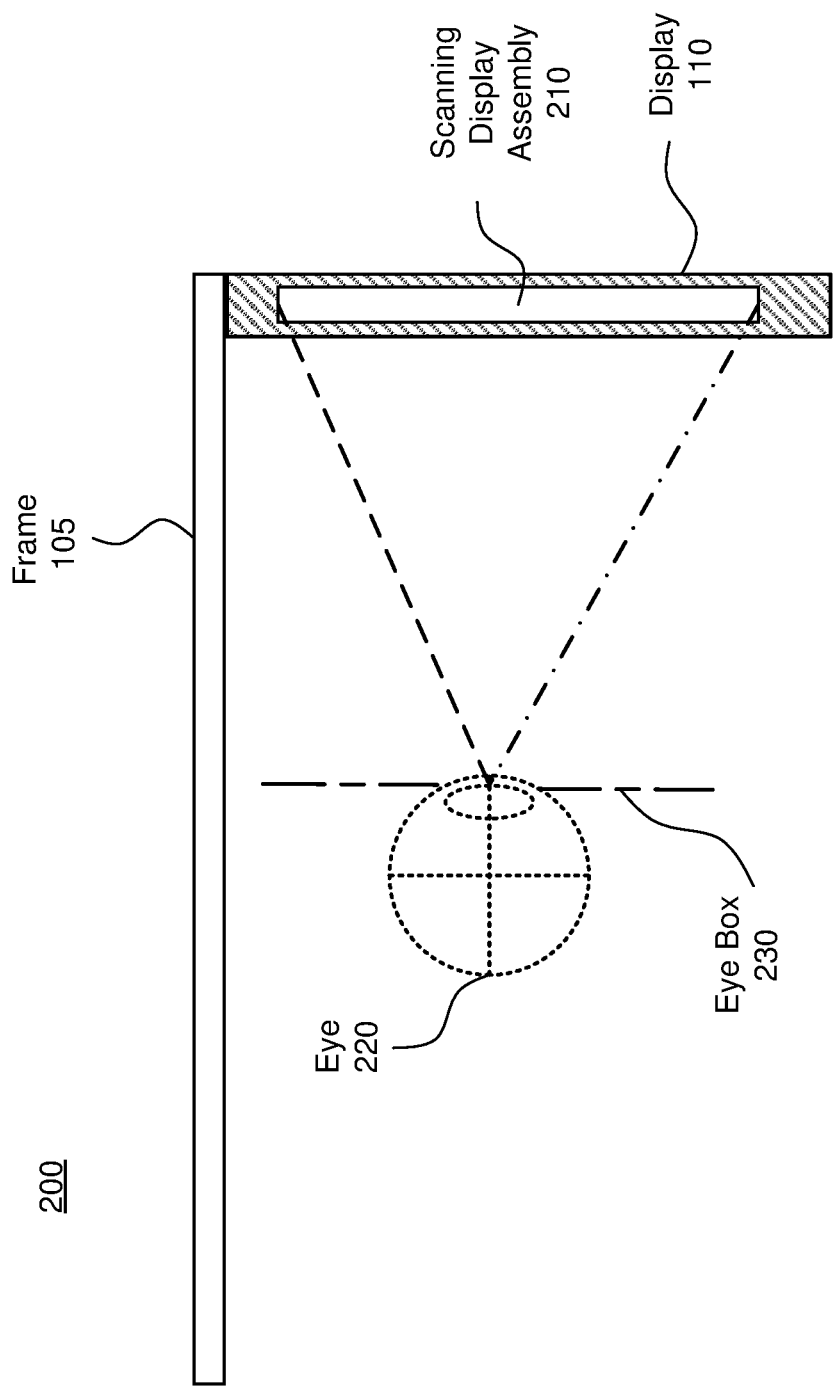
FIG. 2 is a cross sectional view of an eyewear of the NED illustrated in FIG. 1, in accordance with one or more embodiments.

FIG. 2 is a cross sectional view 200 of the NED 100 illustrated in FIG. 1, in accordance with one or more embodiments. The cross sectional view 200 illustrates the display 110, and the display includes at least one scanning display assembly 210. The scanning display assembly 210 provides image light to an eye box 230. The eye box 230 is a location where an eye 220 is positioned when a user wears the NED 100. In some embodiments, the frame 105 may represent a frame of eye-wear glasses. For purposes of illustration, FIG. 2 shows the cross section 200 associated with a single eye 220 and a single scanning display assembly 210, but in alternative embodiments not shown in this illustration, another waveguide assembly which is separate from the scanning display assembly 210, provides image light to another eye of the user.

The scanning display assembly 210, as illustrated below in FIG. 2, is configured to direct the image light to the eye 220 through the eye box 230. As discussed in detail below with regard to FIGS. 3 and 4, the scanning display assembly 210 includes a source assembly and an output waveguide. The source assembly includes a light source and a scanning assembly (e.g., a scanning mirror) that scans light from the light source to an input area of the output waveguide.

In alternate configurations, the NED 100 includes one or more optical elements between the scanning display assembly 210 and the eye 220. The optical elements may act to, e.g., correct aberrations in image light emitted from the scanning display assembly 210, magnify image light emitted from the scanning display assembly 210, some other optical adjustment of image light emitted from the scanning display assembly 210, or some combination thereof. The example for optical elements may include an aperture, a Fresnel lens, a convex lens, a concave lens, a filter, a reflector, or any other suitable optical element that affects image light.

Figure 3:
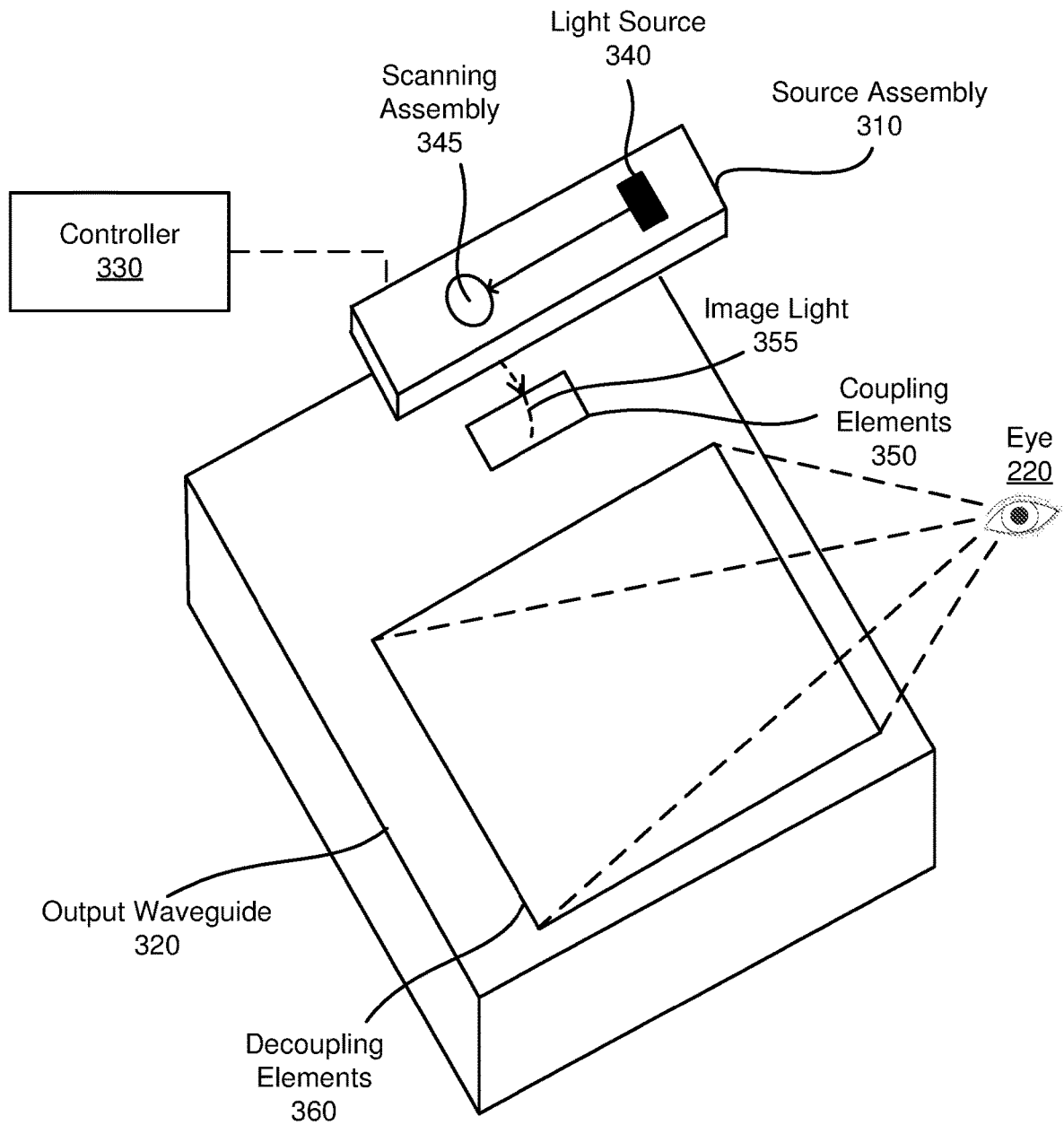
FIG. 3 illustrates an isometric view of a scanning display assembly, in accordance with one or more embodiments.

FIG. 3 illustrates an isometric view of a scanning display assembly 300, in accordance with one or more embodiments. In some embodiments, the scanning display assembly 300 is a component (e.g., scanning display assembly 210) of the NED 100. In alternate embodiments, the scanning display assembly 300 is part of some other NED, or other system that displays image light to a particular location.

The scanning display assembly 300 includes a source assembly 310, an output waveguide 320, and a controller 330. For purposes of illustration, FIG. 3 shows the scanning display assembly 300 associated with a single eye 220, but in some embodiments, another scanning display assembly separate (or partially separate) from the scanning display assembly 300, provides image light to another eye of the user. In a partially separate system, one or more components may be shared between scanning display assemblies for each eye.

The source assembly 310 generates image light 355. The source assembly 310 includes a light source 340 and a scanning assembly 345. The light source 340 is an optical component that generates light using a plurality of rows of emitters. As discussed in detail below with regard to FIGS. 4-6B there are multiple embodiments of different arrangements of the plurality of rows of emitters. The different arrangements of the plurality of rows of emitters generally are either forms of a dense configuration or a sparse configuration. A dense configuration is a configuration of rows of emitters where a threshold distance between adjacent rows is relatively small and there is a relatively small number of rows. For example, in a dense configuration the threshold distance between rows of emitters is less than 30 microns, and may be as small as 10 microns or even less. In some cases the plurality of rows may be divided into a plurality of rows that are each in a dense configuration but are separated by some separation distance. In a sparse configuration, adjacent rows of emitters are separated by a threshold separation distance between adjacent rows is relatively large (e.g., 200-300 microns) and the plurality of rows span a relatively large portion of a field of view, and in some instances the entire field of view. Additionally, in some embodiments, a portion of the light source 340 generates a first band of wavelengths and another portion of the light source 340 generates a second band of wavelengths, such that the light source is polychromatic. Embodiments of the light source 340 are further described in FIGS. 4-6B.

The scanning assembly 345 conditions light from the light source 340, and scans the conditioned light over a portion of a target area. The scanning assembly 345 includes one or more optical elements that condition light from the light source 340. Conditioning may include, e.g., focusing, combining, collimating, filtering, or some combination thereof. The scanning assembly 345 may scan the conditioned light by, e.g., vibrating the one or more optical elements, using one or more scanning mirrors, dynamically redirecting light (e.g., using one or more liquid lenses), or some combination thereof. Embodiments of the light source and scanning assembly are further described below in FIGS. 4-6B.

The output waveguide 320 is an optical waveguide that outputs images to the eye 220 of the user. The output waveguide 320 receives the image light 355 at one or more coupling elements 350. The one or more coupling elements 350 couple the image light 355 from the source assembly 310 into the output waveguide 320. The one or more coupling elements 350 may include, e.g., a diffraction grating, a holographic grating, some other element that couples the image light 355 into the output waveguide 320, or some combination thereof. For example, in embodiments where the coupling elements 350 include a diffraction grating, the pitch of the diffraction grating is chosen such that total internal reflection occurs, and the image light 355 propagates internally toward the one or more decoupling elements 360. For example, the pitch of the diffraction grating may be in the range of 300 nm to 600 nm.

The output waveguide 320 is configured to expand the in-coupled image light 355 in at least one dimension to form expanded image light. One advantage of the source assembly 310 is that the image light 355 is bright enough to mitigate dimming that inherently occurs as light is expanded by the output waveguide 320. The output waveguide 320 guides the expanded image light 355 to one or more decoupling elements 360.

The one or more decoupling elements 360 decouple the total internally reflected image light from the output waveguide 320. The one or more decoupling elements 360 may include, e.g., a diffraction grating, a holographic grating, some other element that decouples image light out of the output waveguide 320, or some combination thereof. For example, in embodiments where the one or more decoupling elements 360 include a diffraction grating, the pitch of the diffraction grating is chosen to cause incident image light to exit the output waveguide 320. An orientation and position of the light exiting from the output waveguide 320 is controlled by changing an orientation and position of the image light 355 entering the one or more coupling elements 350. For example, the pitch of the diffraction grating may be in the range of 300 nm to 600 nm.

The output waveguide 320 may be composed of one or more materials that facilitate total internal reflection of the image light 355. The output waveguide 320 may be composed of e.g., silicon, plastic, glass, or polymers, or some combination thereof. The output waveguide 320 has a relatively small form factor. For example, the output waveguide 320 may be approximately 50 mm wide along x-dimension, 30 mm long along y-dimension and 0.5-1 mm thick along z-dimension.

The controller 330 controls the scanning operations of the source assembly 310. The controller 330 determines scanning instructions for the source assembly 310 based at least on the one or more display instructions. Display instructions are instructions to render one or more images. In some embodiments, display instructions may simply be an image file (e.g., bitmap). The display instructions may be received from, e.g., a console of a NED system (not shown here). Scanning instructions are instructions used by the source assembly 310 to generate image light 355. The scanning instructions may include, e.g., a type of a source of image light (e.g., monochromatic, polychromatic), a scanning rate, an orientation of a scanning apparatus, one or more illumination parameters (described below with reference to FIG. 4), or some combination thereof. The controller 330 includes a combination of hardware, software, and/or firmware not shown here so as not to obscure other aspects of the disclosure.

Figure 4:
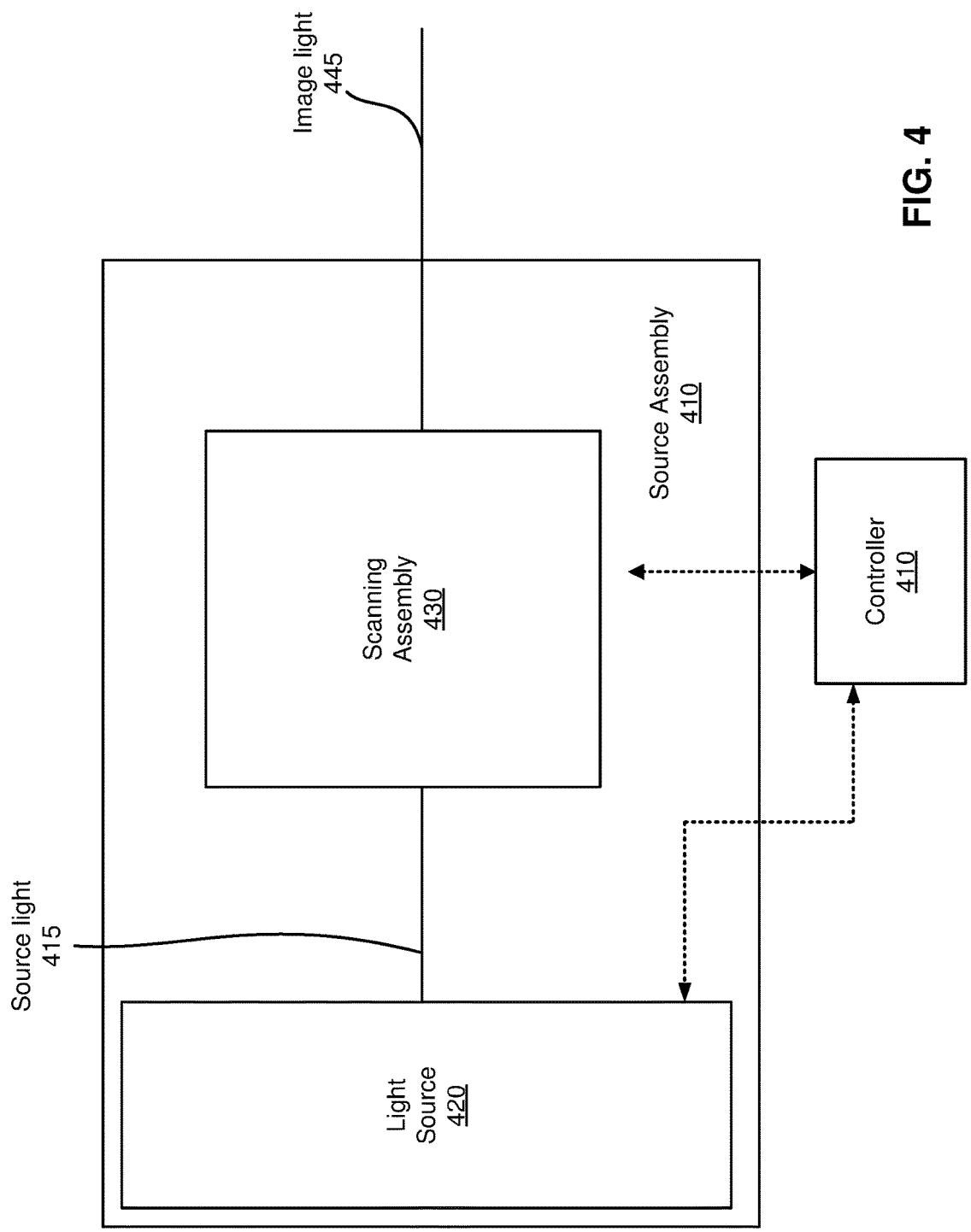
FIG. 4 is a block diagram a source assembly with a controller, in accordance with one or more embodiments

FIG. 4 is a block diagram 400 a source assembly 400 with a controller 410, in accordance with one or more embodiments. The source assembly 400 is an embodiment of the source assembly 310. The source assembly 400 generates image light 445 in accordance with scanning instructions from the controller 410. The source assembly 400 includes a light source 420 and a scanning assembly 430. The light source 340 is an embodiment of the light source 420; the scanning assembly 345 is an embodiment of the scanning assembly 430; and the controller 330 is an embodiment of the controller 410.

The light source 440 is a source of light that generates a spatially coherent or a partially spatially coherent source light 415. The light source 440 emits light in accordance with one or more illumination parameters received from the controller 410. An illumination parameter is an instruction used by the light source 440 to generate light. An illumination parameter may include, e.g., source wavelength, pulse rate, pulse amplitude, beam type (continuous or pulsed), other parameter(s) that affect the emitted light, or some combination thereof. The light source 440 comprises a plurality of emitters, wherein each emitter may be, e.g., a superluminous LED, a laser diode, a vertical cavity surface emitting laser (VCSEL), a light emitting diode (LED), an organic LED (OLED), a microLED, a tunable laser, or some other light source that emits coherent or partially coherent light. The emitters of the light source 440 emit light in a visible band (e.g., from about 390 nm to 700 nm), and they may emit light in accordance with one or more illumination parameters.

The light source 420 includes a plurality of rows of emitters. In some embodiments, all of the emitters in a row emit in the same color channel (e.g., red, blue, green, etc.). In alternate embodiments, one or more of the emitters in a row emit in different color channels. Additionally, as described in detail below with regard to FIGS. 5A-D and 6A-B the plurality of rows may be arranged in dense configuration(s) or a sparse configuration.

The scanning assembly 430 conditions source light 415 from the light source 440, and scans the conditioned light to a target location. The scanning assembly 430 comprises one or more optical components (e.g., lenses, mirrors, apertures, gratings, scanning mirror, liquid lenses, etc.) that are configured to condition the source light 415. Conditioning the source light 415 may include, e.g., expanding, collimating, focusing, correcting for one or more optical errors (e.g., field curvature, chromatic aberration), some other operation which prepares light for scanning, or some combination thereof.

The scanning assembly 430 is configured to scan conditioned source light 415 in at least one dimension based on scanning instructions from the controller 410. The scanning assembly 430 includes at least one optical element that scans the conditioned source light 415 to a target area (e.g., a coupling element of an output grating) as image light 445. The at least one optical element scans the conditioned source light 415 in at least one dimension to form the image light 445. In some embodiments, the image light 445 may represent a two-dimensional line image of the media presented to user's eyes. In alternate embodiments, the scanning assembly 430 can also perform a raster scanning both horizontally and vertically. For example, the at least one optical element may include one or more scanning mirrors that scan the image light 445 to the target area.

In some embodiments, the scanning assembly 430 includes a scanning mirror that scans in at least two dimensions (e.g. horizontal and vertical dimensions). The scanning mirror may be, e.g., a galvanometer mirror, a microelectromechanical systems (MEMS) mirror (e.g., an electromagnetic MEMS mirror, a large angle electrostatic MEMS mirror, etc.), or some other optical element that reflects light. The galvanometer mirror may represent any electromechanical instrument that indicates that it has sensed an electric current by deflecting a beam of image light with one or more mirrors. In some embodiments, the MEMS mirror can include a plurality of micro fabricated optical components made on a semiconductor wafer. In other embodiments, the scanning assembly 430 includes a plurality of scanning mirrors that each scan in orthogonal directions to each other. In some embodiments, the scanning assembly 430 does not include a scanning mirror. Instead, a position of an optical element may be rapidly adjusted relative to the light source 420 (e.g., by vibrating the optical element and/or the light source 420) to scan the conditioned source light 415 over the target area. Alternatively, the optical element may include one or more liquid lenses whose optical power is adjusted to scan the source light 415 over the target area. In some embodiments, the at least one optical element that scans the conditioned source light 415 also acts to condition the source light 415. For example, a lens may scan the image light by rapid adjustment of its position relative to the light source 620 (e.g., by vibrating the lens and/or the light source 620). Note, while various methods of scanning the image light 445 have been discussed above, in some embodiments, the scanning assembly 430 may scan the image light 445 using some combination of the scanning methods (e.g., a scanning mirror and a plurality of liquid lenses) described or some other scanning methodology.

Note that expansion of the image light within an optical waveguide (e.g., the optical waveguide 320) can result in a dimming of light. An advantage of the multiple rows of emitters in the light source 400 is that brightness of the image light 445 is enough to offset dimming caused by expansion of the light within the output waveguide. For example, if a single row of microLED can make 50 nits, then 10 rows results in a display brightness of ~500 nits. And 500 nits is enough to offset dimming that may occur when the image light 445 is expanded.

The controller 410 controls the light source 440 and the scanning assembly 430. The controller 410 takes content for display, and divides the content into discrete sections. The controller 410 instructs the light source 420 to sequentially present the discrete sections using individual emitters corresponding to a respective line in an image ultimately displayed to the user. The controller 410 instructs the scanning assembly 430 to condition and scan the presented discrete sections. Accordingly, at the eye box of the output waveguide, each discrete portion is presented in a different location. While each discrete section is presented at different times, the presentation and scanning of the discrete sections occurs fast enough such that a user's eye integrates the different sections into a single image or series of images. The controller 410 also provides the illumination parameters to the light source 420. Thus the controller 410 may control each individual emitter of the light source 420.

Figure 5A:
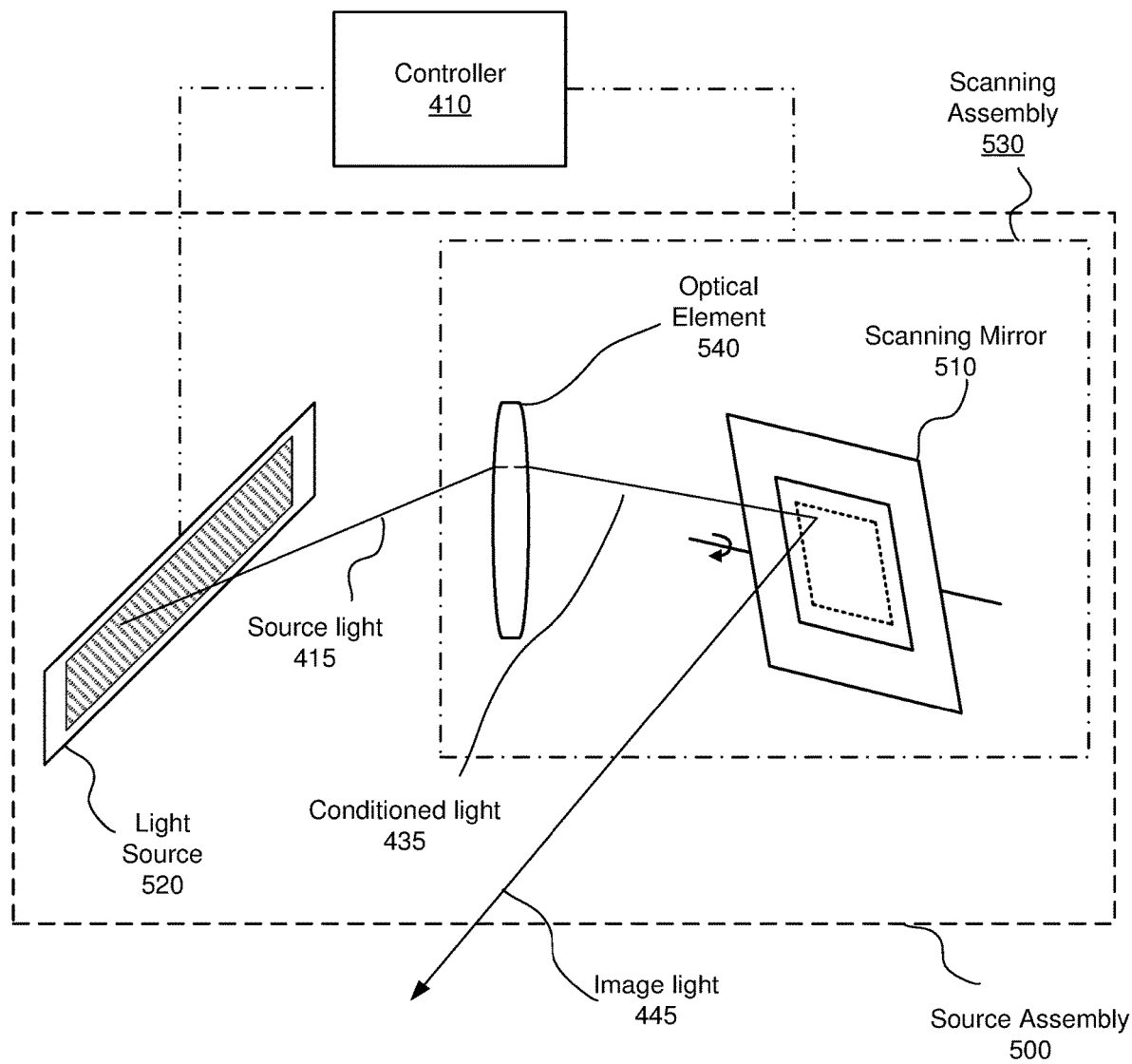
FIG. 5A illustrates example operation of a source assembly that includes a scanning mirror, in accordance with one or more embodiments.

FIG. 5A illustrates example operation of a source assembly 500 that includes a scanning mirror 510, in accordance with one or more embodiments. The source assembly 500 includes a light source 520 and a scanning assembly 530 that are coupled to the controller 410. The source assembly 500 is an embodiment of the source assembly 400.

The light source 520 emits the source light 415 in accordance with scanning instructions from the controller 410. The light source 520 is an embodiment of the light source 420 that includes a plurality of rows of emitters. The plurality of rows of emitters may be arranged in a single dense configuration as described below with reference to FIG. 5B or as a plurality of dense configurations (e.g., as described below with reference to FIG. 5C). A dense configuration is a configuration of rows of emitters where a threshold distance between adjacent rows is relatively small and there is a relatively small number of rows. For example, in a dense configuration the threshold distance between rows of emitters is less than 30 microns, and may be as small as 10 microns or even less. Additionally, the number of rows in a dense configuration is much smaller than a number of emitters in each row. The ratio of emitters in a row to a number of rows is at least 100:1 and may be as much as 1000:1. For example, in some cases the horizontal pixel count is ~2000 and number of rows is 10, resulting in a 200:1 ratio of emitters in a row to a number of rows. Accordingly, a dense configuration of rows may act as a strip source. Each dense configuration has a long side and a short side. The long side is a dimension of the dense configuration that is longer than the short side, and the short side corresponds to a scanning direction (i.e., a direction in which the source light 415 is scanned). This is discussed in detail below with regard to FIGS. 5B and 5C.

An image may be divided into one or more image sections. Each image section has a corresponding field of view that corresponds to an angular range of light that is ultimately provided to an eyebox. In cases where there is a single image section, the single image section corresponds to the entire image. In contrast, in cases where there are a plurality of image sections, each image sections corresponds to a different portion of the image, and there may be some overlap among different portions.

In some embodiments, a dense configuration of rows may be scanned over an entire field of view of an image section (and hence an image presented to the user). This configuration is discussed in detail below with regard to FIG. 5B. In other embodiments, a plurality of dense configurations are arranged with a relatively large threshold distance between each of the plurality of dense configurations. In this case, light emitted from each of the plurality of dense configurations corresponds to, approximately, a particular portion of a field of view of the image section. For example, as discussed below with regard to FIG. 5C, two dense configurations may be positioned such that each correspond to a respective half of a field of view of the image section. In other embodiments, more than two dense configurations may be used. For example 3 may be used, where each dense configuration corresponds to, approximately, a respective third of the field of view of the image section.

In some embodiments, the light source 520 may be polychromatic, and include rows that include emitters that are associated with different color channels (e.g., red, green, blue, etc.). For example, emitters in a given row may emit red light, green light, and blue light. In other embodiments, each row of emitters may be a single color channel, and the rows may be interlaced (e.g., a red row adjacent to a green row that is adjacent to a blue row) or blocked (e.g., a plurality of adjacent red rows followed by a plurality of adjacent green rows, followed by a plurality of adjacent blue rows).

The scanning assembly 530 is an embodiment of the scanning assembly 430. The scanning assembly 530 includes an optical element 540 and the scanning mirror 510. The optical element 540 conditions the source light 415. The optical element 540 may be a conventional lens (e.g., a positive spherical lens), a freeform lens, or some other type of lens. As illustrated in FIG. 5A, the optical element 540 is a single lens that that collimates the source light 415. In other embodiments, the optical element 540 may include additional lenses and/or include other types of optical elements. Additionally, in some embodiments, the optical element 540 may perform other types of conditioning (e.g., expanding, focusing, correcting for one or more optical errors (e.g., field curvature, chromatic aberration), some other operation which prepares light for scanning, etc.).

The scanning mirror 510 scans the conditioned source light 415 in accordance with the scanning instructions to form the image light 445. The scanning mirror 510 may be e.g., a MEMS mirror, a galvanometer mirror, or some other mirror configured to scan in accordance with the scanning instructions. In this embodiment, the scanning mirror 510 scans in the scanning direction (i.e., a direction parallel to the short side of the one or more dense configurations in the light source 520).

Figure 5B:
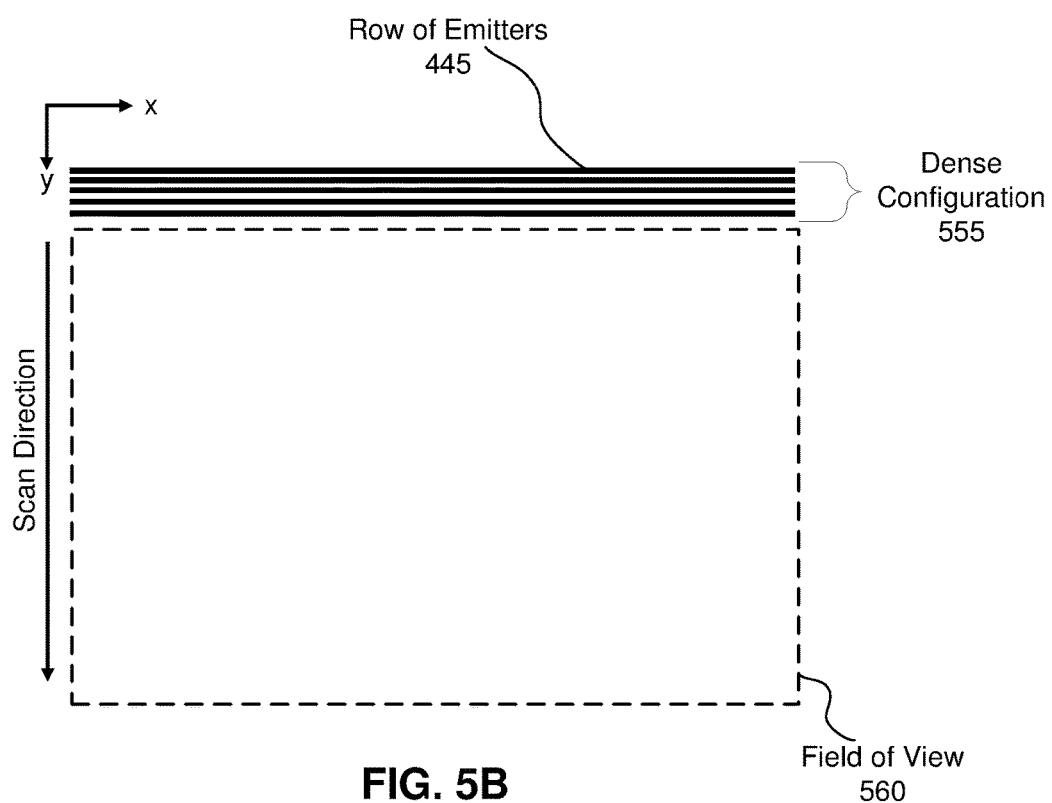
FIG. 5B illustrates a scan methodology for a light source that includes a single dense configuration, in accordance with one or more embodiments.

FIG. 5B illustrates a scan methodology 550 for a light source that includes a single dense configuration 555, in accordance with one or more embodiments. The dense configuration 555 includes a plurality of rows of emitters 445. Each row of emitters has a long side that is generally parallel to an x-dimension and a short side that is generally parallel to a y-dimension. Light emitted from the dense configuration 555 is scanned along the y-dimension in a scan direction over a field of view 560 of an image section. In FIG. 5B, the dense configuration 555 is scanned out over the entire field of view 560. In some cases the image section corresponds to the entire image. In other embodiments, the image section may be one of a plurality of image sections that together make up the entire image.

FIG. 5C illustrates a scan methodology 570 for a light source that includes two dense configurations 575, 580, in accordance with one or more embodiments. In this embodiment, the light source includes a plurality of rows of emitters that include a first subset of rows of emitters that make up the dense configuration 575 and a second subset of rows of emitters that make up the dense configuration 580. A distance, D, separates the dense configuration 575 from the dense configuration 580. The distance D is substantially greater than a distance between adjacent rows in a given dense configuration. The distance D may be a factor of 100 times greater than a distance between adjacent rows in a given dense configuration. Note in embodiments, where there are more than two dense configurations the distance D between adjacent dense configurations may be reduced.

In embodiments with two dense configurations, each dense configuration covers about half of a vertical portion (i.e., along the y dimension) of the field of view 560. Suppose the field of view 560 is H (degree)×V (degree), where H is an angular field of view along the x dimension, and V is an angular field of view along the y dimension. If a row length is L mm, then the distance D between adjacent dense configurations is about (L/H)*(V/2). Generally, it should be a little bit smaller so that there is some overlap between two sections of image (e.g., to help prevent image artifacts). As an example, if the field of view 560 is 52×30 degree, and horizontal row length is 5 mm, then the separation D~(5/52)*15 which is about 1.4 mm.

In this embodiment the scanning mirror (e.g., the scanning mirror 510) is configured to simultaneously scan light from dense configuration 575 over a first portion of the field of view 560 and light from the dense configuration 580 over a second portion of the field of view 560. In some embodiments, the first portion of the field of view 560 and the second portion of the field of view 560 are each the same size and correspond to respective halves of the field of view 560. In alternate embodiments, the first and second portions of the field of view 560 are different sizes. Note that the scan methodology 570 includes multiple dense configurations relative to the scan methodology 550. However, one advantage is that a scanning bandwidth of the scanning mirror is substantially reduced relative to the scanning mirror for the scan methodology 550 as the scanning mirror scans, e.g., the dense configuration 575 over a portion of the first portion of the field of view 560 and not the entire field of view 560.

FIG. 5D illustrates a plot 590 of intensity transition between two adjacent dense configurations, in accordance with one or more embodiments. The plot 590 illustrates an intensity profile 592 that corresponds to an intensity of light emitted from a first dense configuration (e.g., the dense configuration 575) and an intensity profile 594 that corresponds to an intensity of light emitted from an adjacent dense configuration (e.g., the dense configuration 580). The plot also illustrates an overall intensity 596. The intensity profile 592 corresponds to scanned light over a first portion of a target area, and the intensity profile 594 corresponds to scanned light over a second portion of the target area that is adjacent to the first portion.

To mitigate image stitching artifacts (e.g., dimming), a controller (e.g., the controller 410) may cause the scanning mirror to slightly overscan within an overscan region 598. In some embodiments, the overscan results in an overall intensity 596 whose gradient is unchanged across the overscan region 598. In some embodiments, the amount of oversteer is selected such that a brightness value of the scanned light at the overscan region 598 is at least as bright as the scanned light at the first portion of the target area, and is at least as bright as the scanned light at the second portion of the target area. The overscan region 598 may correspond to approximately 1 degree of the field of view 560.

Figure 6A:
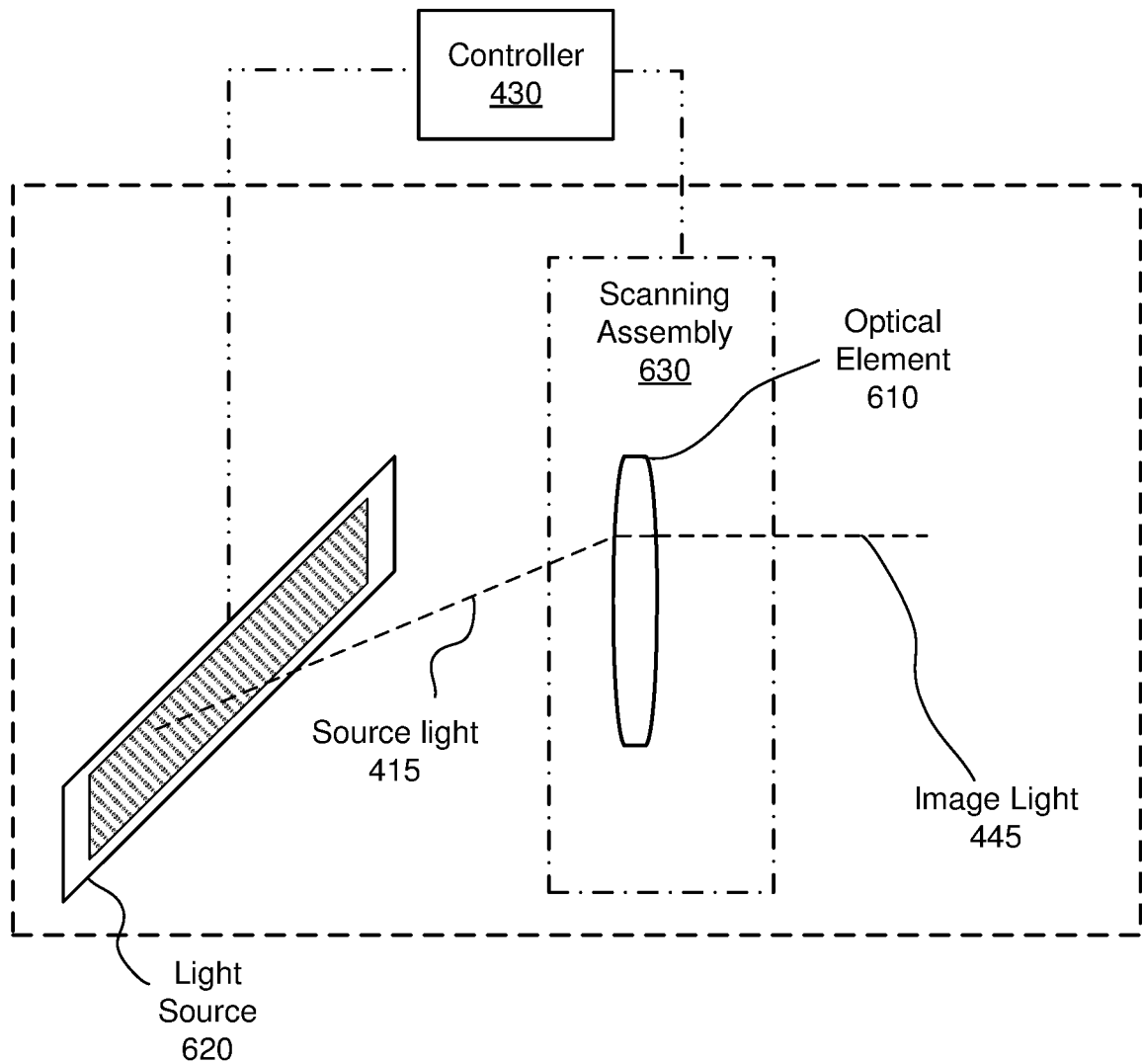
FIG. 6A illustrates example operation of a source assembly that includes an optical element that conditions and scans source light, in accordance with one or more embodiments.

FIG. 6A illustrates example operation of a source assembly 600 that includes an optical element 610 that conditions and scans the source light 620, in accordance with one or more embodiments. The source assembly 600 includes a light source 620 and the scanning assembly 630.

The light source 620 emits the source light 415 in accordance with scanning instructions from the controller 410. The light source 620 is an embodiment of the light source 420 that includes a plurality of rows of emitters in a sparse configuration. A sparse configuration is a configuration of rows of emitters where a threshold separation distance between adjacent rows is relatively large (e.g., 200-300 microns) and the plurality of rows span a relatively large portion of a field of view, and in some instances the entire field of view. For example, in a sparse configuration the threshold separation distance between adjacent rows of emitters may be greater than 100 microns, and may be more than 300 microns. If a row length is L mm, then the separation distance between adjacent rows is about ((L/H)*(V))/(N−1), where N is the number of rows. For example, if L=5 mm, H=52°, V=30°, and N=10, then the separation between adjacent rows in a sparse configuration should be around ~0.32 mm.

Each row in a sparse configuration has a long side and a short side. The long side is a dimension of a row that is longer than the short side, and the short side corresponds to a scanning direction (i.e., a direction in which the source light 415 is scanned). This is discussed in detail below with regard to FIG. 6B. In sparse configuration, each row scans a section of a field of view (e.g., the field of view 560). For example, if there are 10 sparse rows, then each row scans about $1/10^{th}$ of the field of view, or 3 degrees if the vertical FOV of display is 30 degrees. Generally, one would overscan by a small amount with dimming intensity profile (similar to FIG. 5D) to avoid image artifacts.

In some embodiments, the light source 620 may be polychromatic. In a polychromatic sparse configuration, a row includes emitters that are associated with different color channels (e.g., red, green, blue, etc.). For example, a given row of emitters may emit red light, green light, and blue light. In other embodiments, each row is associated with a single color channel (e.g., the entire row emits red light). In some embodiments, the plurality of rows are separated into a plurality of groups and each group is separated from an adjacent group by the threshold separation distance. And rows within each group are separated from adjacent rows within the group by a second distance that is substantially less (e.g., 10 microns) than the threshold separation distance. In some embodiments, each group includes a plurality of rows that are each associated with a different respective color channel (e.g., a row that emits red light, a row that emits green light, etc.), and each group of rows are separated by the threshold separation distance (e.g., ~hundreds of microns).

The scanning assembly 630 is an embodiment of the scanning assembly 430. In some embodiments, the scanning assembly 630 rapidly adjusts a relative position of the optical element 610 relative to the light source 620. For example, the scanning assembly 630 may vibrate the optical element 610 and/or the light source 620 in a direction parallel to the scanning direction of the light source 620. The vibration may be accomplished using, e.g., voice coil motors, piezoelectric vibrator, micro actuators, or some other vibration mechanisms. In other embodiments, the optical element 610 may include a plurality of liquid lenses that can dynamically direct the image light 445 to different locations in accordance with the scanning instructions. Note that to mitigate a user being able to see image artifacts (e.g., during a saccade of the eye) caused by the scan of a light source 620 in a sparse configuration, the scan rate for this embodiment may be 1 KHz or more. This is due to a small angle over which the rows in a sparse configuration are scanned relative to, e.g., the relatively large angle rows are scanned in a dense configuration (e.g., in a dense configuration a scan rate may be ~100 Hz).

The optical element 610 conditions the source light 415. As illustrated in FIG. 6A, the optical element 610 is a single lens that collimates the source light 415. The single lens may be, e.g., a conventional lens, a freeform lens, etc. In other embodiments, the optical element 610 may include additional lenses and/or include other types of optical elements. Additionally, in some embodiments, the optical element 610 may perform other types of conditioning (e.g., expanding, focusing, correcting for one or more optical errors (e.g., field curvature, chromatic aberration), some other operation which prepares light for scanning, etc.).

An advantage of this embodiment is that it does not use a scanning mirror 510 like that of FIG. 5A. In FIG. 5A, the scanning mirror 510 is generally located near a pupil of optical element 540. Without a scanning mirror, the pupil of the optical element 610 can be located very close to the optical element 610 (e.g., less than 250 microns), this makes lens design easier and results in a smaller lens package and easier to manufacture (e.g., may just be a conventional lens—versus a freeform lens) when compared to e.g., the optical element 540. Additionally, as a scanning mirror is not used in this embodiment, beam walk off is substantially less than that which can occur in the source assembly 500.

Figure 6B:
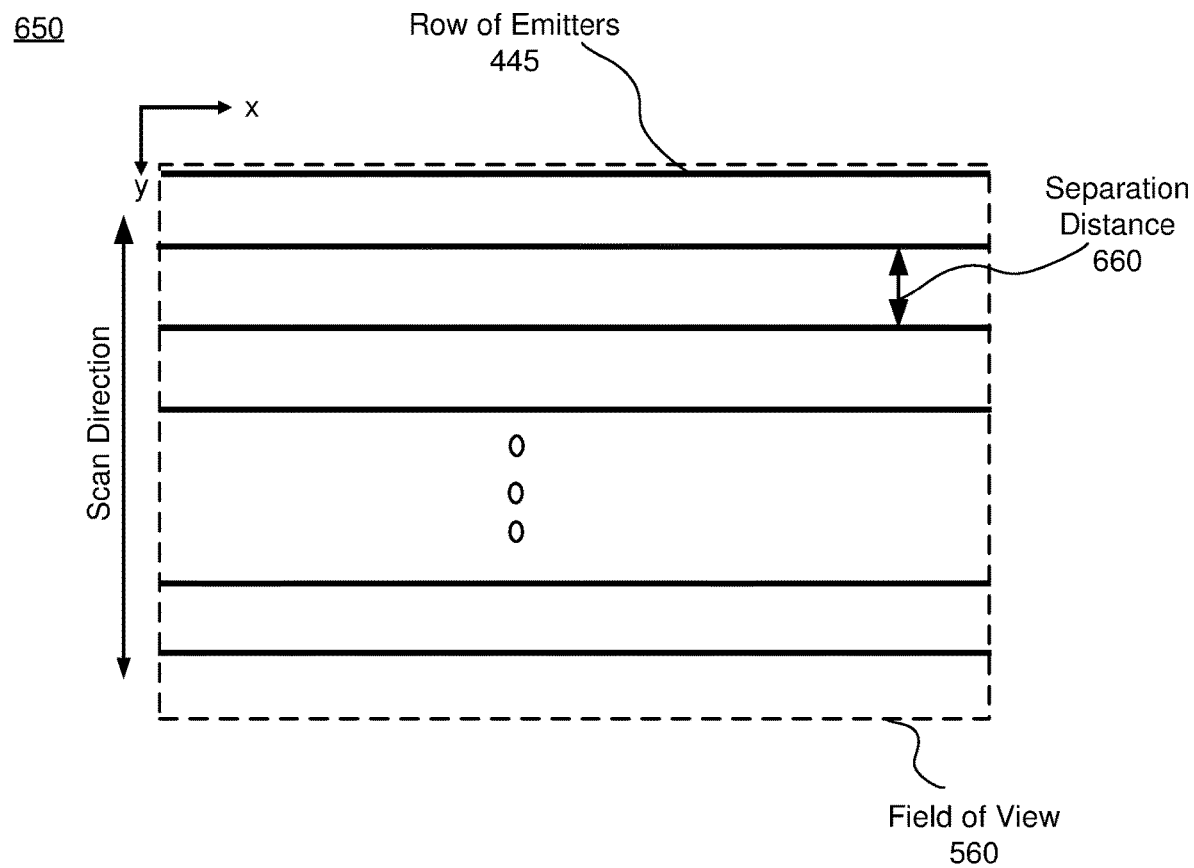
FIG. 6B illustrates a scan methodology for the source assembly of FIG. 6A, in accordance with one or more embodiments.

FIG. 6B illustrates a scan methodology 650 for the source assembly 620 of FIG. 6A, in accordance with one or more embodiments. As noted above, the source assembly 410 includes the light source 620 that is in a sparse configuration. The sparse configuration includes a plurality of rows of emitters 445, and adjacent rows are separated from each other by a separation distance 660. Each row of emitters has a long side that is generally parallel to an x-dimension and a short side that is generally parallel to a y-dimension. Light emitted from the sparse configuration of rows is scanned back and forth along the y-dimension along a scan direction a field of view 560 of an image section. The image section may correspond to the entire image, or in some embodiments a portion of the entire image. In FIG. 6B, the angle of scan is relatively small as the scan angle for each row is on the order of a degree, such that each row of emitters corresponds to a small number of lines in the image. For example, if the total number of rows in a sparse configuration is 10, then each row (or group of rows) would scan 3-4 degrees in order to cover a full vertical angular field of view (≥30 degree). In some embodiments, an image may have format of pixel count 1000-1500 in a vertical direction (y-dimension), then each sparse line would cover 100-150 pixels, or 100-150 rows of vertical image. In contrast, the scan angle for a dense configuration (e.g., as shown in FIG. 5B or 5C) may be on the order of 20 or more degrees.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A scanning display comprising:
a light source configured to emit source light from a plurality of rows of emitters that are arranged in a plurality of dense configurations parallel to a first dimension; and
a scanning assembly configured to:
condition the source light,
scan the conditioned source light along a second dimension that is orthogonal to the first dimension to form scanned image light, and
output the scanned image light to a portion of a target area of an output waveguide, a brightness of each portion of the scanned image light corresponding to a respective dense configuration of the plurality of dense configurations being controlled to have a constant gradient across an overscan region corresponding to an angular portion of a field-of-view (FOV) such that an overall brightness intensity of the scanned image light is flat across the FOV,
the output waveguide configured to:
expand the scanned image light in at least one dimension to form an expanded image light, and
output the expanded image light to an eyebox of a headset.

2. The scanning display of claim 1, wherein the scanning assembly comprises a scanning mirror configured to scan the conditioned source light along the second dimension.

3. The scanning display of claim 2, wherein the scanning mirror is a microelectromechanical mirror.

4. The scanning display of claim 1, wherein the scanning assembly comprises at least one optical element being a freeform lens configured to condition the source light.

5. The scanning display of claim 1, wherein the plurality of rows of emitters includes a first subset of rows of emitters and a second subset of rows of emitters, and a scanning mirror of the scanning assembly is configured to simultaneously scan light from the first subset of rows of emitters over a first portion of the target area and light from the second subset of rows of emitters over a second portion of the target area.

6. The scanning display of claim 5, wherein the scanning assembly is further configured to oversteer the scanning mirror such that a brightness value of the scanned image light at the overscan region between the first portion of the target area and the second portion of the target area is at least as bright as at the first portion of the target area.

7. The scanning display of claim 1, wherein a threshold distance between adjacent rows of the plurality of rows of emitters is at least 200 microns, and the scanning assembly is configured to adjust at least one optical element such that the at least one optical element scans the conditioned source light along the second dimension.

8. The scanning display of claim 1, wherein the scanning assembly is configured to adjust at least one optical element using one or more voice coil motors that cause the at least one optical element to vibrate to scan the conditioned source light.

9. The scanning display of claim 1, wherein the plurality of rows of emitters include emitters configured to emit in different optical bands.

10. The scanning display of claim 1, wherein the headset is a near-eye display.

11. A near-eye display (NED) comprising:
a light source configured to emit source light from a plurality of rows of emitters that are arranged in a plurality of dense configurations parallel to a first dimension;
a scanning assembly configured to:
condition the source light,
scan the conditioned source light along a second dimension that is orthogonal to the first dimension to form scanned image light, and
output the scanned image light over a portion of a target area, a brightness of each portion of the scanned image light corresponding to a respective dense configuration of the plurality of dense configurations being controlled to have a constant gradient across an overscan region corresponding to an angular portion of a field-of-view (FOV) such that an overall brightness intensity of the scanned image light is flat across the FOV; and
an output waveguide including a coupling element positioned at the target area, the coupling element configured to:
in-couple the scanned image light,
expand the in-coupled light in at least one dimension to form an expanded image light, and
output the expanded image light to an eyebox of the NED.

12. The NED of claim 11, wherein the scanning assembly comprises
a scanning mirror configured to scan the conditioned source light along the second dimension.

13. The NED of claim 12, wherein the scanning mirror is a microelectromechanical mirror.

14. The NED of claim 11, wherein the scanning assembly comprises at least one optical element being a freeform lens configured to condition the source light.

15. The NED of claim 11, wherein the plurality of rows of emitters includes a first subset of rows of emitters and a second subset of rows of emitters, and a scanning mirror of the scanning assembly is configured to simultaneously scan light from the first subset of rows of emitters over a first portion of the target area and light from the second subset of rows of emitters over a second portion of the target area.

16. The NED of claim 15, wherein the scanning assembly is further configured to oversteer the scanning mirror such that a brightness value of the scanned image light at the overscan region between the first portion of the target area and the second portion of the target area is at least as bright as at the first portion of the target area.

17. The NED of claim 11, wherein a threshold distance between adjacent rows of the plurality of rows of emitters is at least 200 microns, and the scanning assembly is configured to adjust at least one optical element such that the at least one optical element scans the conditioned source light along the second dimension.

18. The NED of claim 11, wherein the scanning assembly is configured to adjust at least one optical element using one or more voice coil motors that cause the at least one optical element to vibrate to scan the conditioned source light.

19. The NED of claim 11, wherein the plurality of rows of emitters include emitters configured to emit in different optical bands.

20. The NED of claim 11, wherein the target area is an input grating on the output waveguide.

\* \* \* \* \*